July 12, 1927.
N. PERRY
CHAIN LINK
Filed July 21, 1921
1,635,385
2 Sheets-Sheet 1
 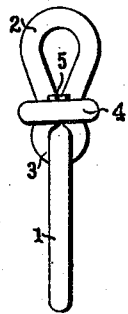 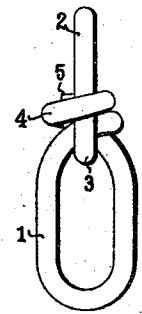 
Fig.1  Fig.2  Fig.3  Fig.4
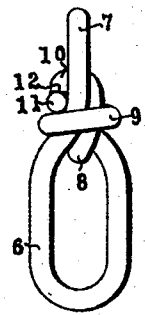 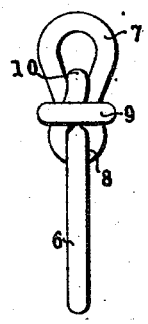 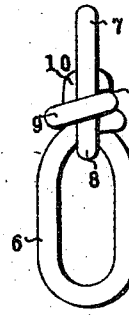 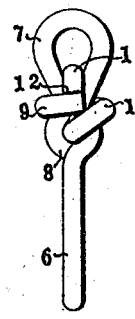
Fig.5  Fig.6  Fig.7  Fig.8
INVENTOR
NORVIN PERRY.
BY
ATTORNEYS July 12, 1927. 1,635,385
N. PERRY
CHAIN LINK
Filed July 21, 1921  2 Sheets-Sheet 2

INVENTOR
NORVIN PERRY.
BY
ATTORNEYS

Patented July 12, 1927.

1,635,385

UNITED STATES PATENT OFFICE.

NORVIN PERRY, OF TOMPKINSVILLE, NEW YORK.

CHAIN LINK.

Application filed July 21, 1921. Serial No. 486,411.

This invention relates to chain links, and more particularly to twisted wire chain links formed from a single continuous strand of material, such as are commonly used in anti-skid chains for automobile tires and for other purposes.

It is a primary object of this invention to provide an improved chain link of the character mentioned adapted to resist distortion and rupture, and requiring a minimum amount of material.

It is another object to provide such a strong and practical link wherein tensile strain tends to bind the ends of the strand against separation.

It is a further object to provide a reliable chain link, which is economical of material, light in weight and inexpensive to manufacture.

Other objects will be in part obvious and in part pointed out hereinafter.

In the drawings, which illustrate certain of the possible embodiments of the invention, Figures 1, 2, 3 and 4 are side views of a preferred form of improved link, each succeeding figure being taken from the right of the preceding one;

Figs. 5, 6, 7 and 8 are similar views of a modified form;

Figure 9:
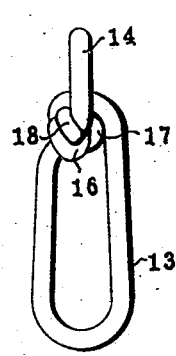
Figs. 9, 10 and 11 are similar side views of a second modification.

Referring first to the form shown in Figs. 1 to 4, inclusive, there is illustrated a link formed from a continuous strand of material bent into a main loop 1 and an auxiliary loop 2, the planes of the loops being substantially at right angles to each other. The present invention concerns generally the forming of a secure middle fastening for and by the ends of the strand. In this first form the free end of the loop 2 is threaded through the loop 1 and bent to form a hook 3 encircling a strand of the loop 1. The free end of the loop 1 is bent into a transverse coil 4 encircling the connecting part between the two loops of the link and binding the extremity 5 of the hook 3 closely against the neck. It is here to be noted that the reduced portion of the link, i. e., that part of the same which is adjacent the point of connection of the two looped portions, may hereinafter be termed the neck. This transverse coil lies in a plane approximately perpendicular to the planes of the loops of the link. In this way the hook 3 is clamped in closed position by the coil 4 thus preventing disengagement of the strand of the loop 1 therefrom.

The advantages in this and other forms reside in an efficient knotting of the ends of the strand which requires a minimum length of material and with which the strain on the chain results in a tightening of the knot so that the full tensile strength of the wire may be utilized.

The embodiment illustrated in Figs. 5, 6, 7 and 8 is similar to that described. The strand of wire is bent to form a main loop 6 and an auxiliary loop 7, the free ends of which are bent as before, a hook 8 being formed from the end of the loop 7 and an encircling coil 9 from the end of the loop 6. In this form, however, the extremity of the hook 8 extends through the loop 7 and is bent back on itself at 10 to meet the extremity 11 of the coil 9. The two contiguous ends of the strand are welded together at 12, if desired. A knot is thus made which is stronger than the wire which forms the link and each loop is reinforced against distortion by the extremity of the opposite loop which is threaded through and prevents the sides of the loop from coming together under strain. In both the above embodiments the chain strain is central of each loop and a knot is made which is as strong or stronger than the strand of wire. In forming such loops it is found that a saving of material over the links in common use of from eight to fifteen per cent. is realized.

Figure 10:
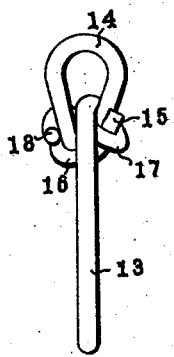
Figure 11:
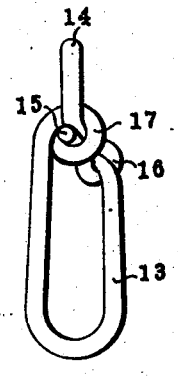

In the embodiment shown in Figs. 9, 10 and 11, a single strand is bent to form a main loop 13 and an auxiliary loop 14, the free end of the latter being threaded through the loop 13, and bent back on itself at 15. In this manner a hook 16 is made which encircles a strand of the loop 13. The free end of the loop 13 passes through the loop 14 and is bent to form a coil 17 which encircles and binds the sides of the hook 16 and extends further through the loop 14 a second time to terminate at its extremity 18 in a bent-back portion lying against the curve of the hook 16. Thus a knot is formed which resists distortion in the same manner as those described and in which the extremities of the strand are securely clamped by strain on the chain, the coiled ends being tightened in proportion to the chain strain.

Figure 12:
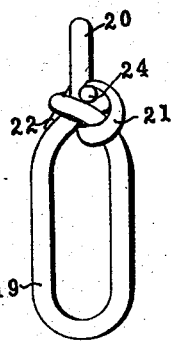
Figs. 12, 13 and 14 are side views of a third modification.
Figure 13:
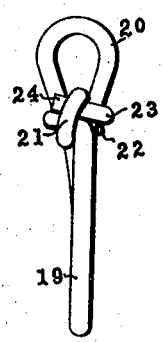
Figure 14:
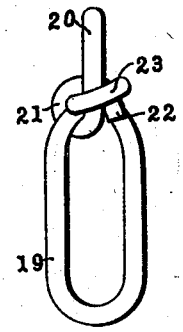

A slightly different form of knot is illustrated in Figs. 12, 13 and 14, in which a link is shown comprising a main loop 19 and an auxiliary loop 20, the ends of which are bent to form mutually bound coils. To accomplish this, the free end of the loop 20 is threaded through the loop 19 to form a coil 21 encircling a side strand of the loop 19 adjacent the neck of the link and extending further through the loop 20 to lie along the other side strand of the loop 19 toward its extremity 22. The free end of the loop 19 is also bent to form a coil 23 encircling the neck of the link and binding the end 22. The extremity 24 of the coil 23 extends further through the coil 21 and is bound thereby. It will be noted that in this form each coil formed from the free ends serves to constrict and bind the end of the other coil and that strain on the link results in a consequent tightening of both coils.

In all the forms shown and described a knot or secure twisted interlocking is formed from the free ends of the loops which is especially strong, the ends being held from separation by friction and by the rigidity of the wire in an efficient manner without waste material. The axes of the two loops in each form lie along the line of strain of the chain and the strain tends to tighten and make the knots more secure under increased pressure.

Thus by the above construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:—

1. A chain link comprising a single continuous strand of material bent to form two single-strand loops, the free end of one of said loops being threaded through the other of said loops and bent back on itself, and the free end of said other loop being coiled about said link adjacent the point of connection of said loops.

2. A chain link comprising a single continuous strand of material bent to form two loops, a free end of one of said loops being threaded through the other of said loops and bent back on itself to encircle a strand of the link, and the free end of said other loop being coiled about said link to encircle and bind three strands thereof adjacent the point of connection of said loops.

3. A chain link comprising a single continuous strand of material bent to form two single-strand loops, the free end of one of said loops being threaded through the other of said loops and bent back on itself, and the free end of said other loop being coiled to encircle said link and the bent-back end of said first mentioned loop adjacent the point of connection of said loops.

4. A chain link comprising a single continuous strand of material bent to form two single-strand loops, the free end of one of said loops being bent to form a hook engaging a strand of the other of said loops, and the free end of said other loop being bent to encircle said link and to clamp the sides of said hook adjacent the point of connection of said loops.

5. A chain link comprising a single continuous strand of material bent to form two loops, a free end of one of said loops being bent to form a hook engaging a strand of the other of said loops, said engaged strand terminating in a transverse reinforcing coil encircling said hook and said link about the point of connection of said loops.

6. A chain link comprising a single continuous strand of material bent to form a single-strand main loop and a single-strand auxiliary loop at right angles thereto, the free end of said auxiliary loop being bent back on itself to encircle a strand of said main loop and the free end of said main loop being bent to form a coil in a plane perpendicular to the planes of said loops, said coil constricting the said link adjacent the point of connection of said loops, said coil also constricting the bent-back end of said auxiliary loop.

7. A chain link comprising a single continuous strand of material bent to form two loops, a free end of one of said loops being bent to form a hook engaging a strand of the other of said loops and extending through said first mentioned loop, and the free end of said other loop being bent to encircle said link and terminating adjacent said first-mentioned free end.

8. A chain link comprising a continuous strand of material bent to form a single-strand main loop and a single-strand auxiliary loop at right angles thereto, the free end of said auxiliary loop being bent to form a hook engaging a strand of said main loop and the free end of said main loop extending through said auxiliary loop and being bent to form a coil binding the sides of said hook and further extending through said auxiliary loop beneath the initial part of said coil and along said hook adjacent the point of connection of said loops.

9. A chain link comprising a continuous strand of material bent to form two single-strand loops, the free end of one of said loops being bent to encircle one side strand of the other of said loops adjacent the point of connection of said loops and further extending through said first mentioned loop to lie along the other side strand of said second mentioned loop, and the free end of said second mentioned loop being coiled about the neck of said link to bind said other end and further extending through the coil thereof and being bound thereby.

10. A chain link, including a wire bent to provide a pair of loops extending in planes substantially at right angles to each other, one end of said wire encircling the inner end of one of said loops, and the other end of said wire encircling said link at the point of juncture of said loops and retaining the first-named wire end against movement.

11. A chain link, including a wire bent to provide a loop, one of the ends of said wire being extended beyond said loop and bent to provide a second loop, said end being further extended around the wire forming said first loop, and the second end of said wire extending around the exterior of said link and said last-named end-portion.

12. A chain link, including a wire bent to provide two loops, the end of one of said loops being extended in the form of a third loop embracing the wire forming said first loop, and the end of said first loop being extended to provide a fourth loop encircling said link adjacent the ends and point of juncture of all of said loops.

In testimony whereof I affix my signature.

NORVIN PERRY.